United States Patent

Nichols

[15] 3,657,055
[45] Apr. 18, 1972

[54] HEAT SEALING STATION

[72] Inventor: Matthew Nichols, Norristown, Pa.

[73] Assignee: Sauter Packaging Company, Souderton, Pa.

[22] Filed: June 23, 1970

[21] Appl. No.: 49,002

[52] U.S. Cl. .............................. 156/583, 100/264, 100/93 P
[51] Int. Cl. ..................................... B30b 15/34, B30b 5/00
[58] Field of Search .......................... 156/583; 100/264, 93 P

[56] References Cited

UNITED STATES PATENTS 3,577,304  5/1971  Guyer ................................... 156/580

Primary Examiner—Douglas J. Drummond
Attorney—Necho and Kimmelman

[57] ABSTRACT

A heat sealing station for laminating superimposed elongate webs of material including an upper heat seal unit and a lower pressure platen in vertical registry, the lower pressure platen having vertical reciprocal motion below the web and the upper heat seal unit having vertical reciprocal motion above the web, the upper heat seal unit further being characterized by resilient mounting construction to cooperate with and to absorb the forces generated by operation of the lower pressure platen.

14 Claims, 8 Drawing Figures

INVENTOR
MATTHEW NICHOLS
BY
Necho and Kimmelman
ATTORNEY

INVENTOR.
MATTHEW NICHOLS
BY
Necho and Kimmelman
ATTORNEY.

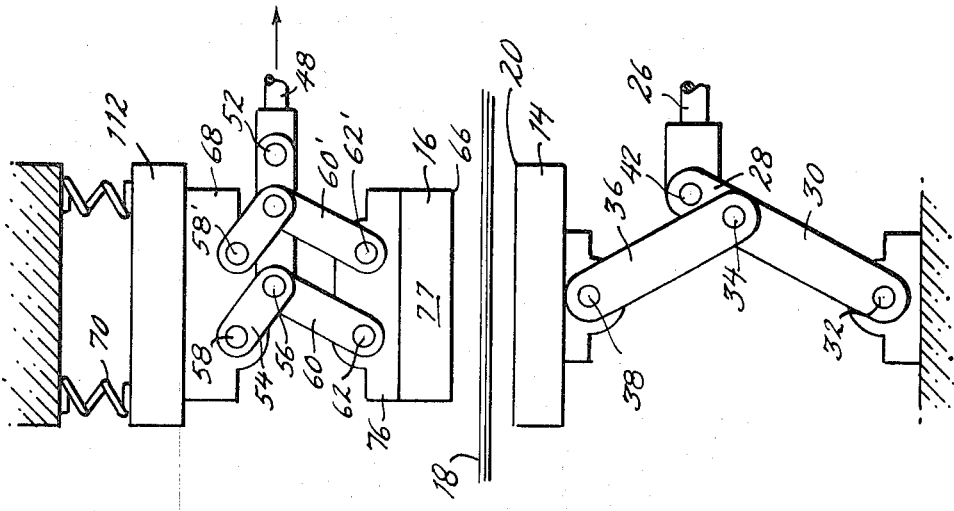
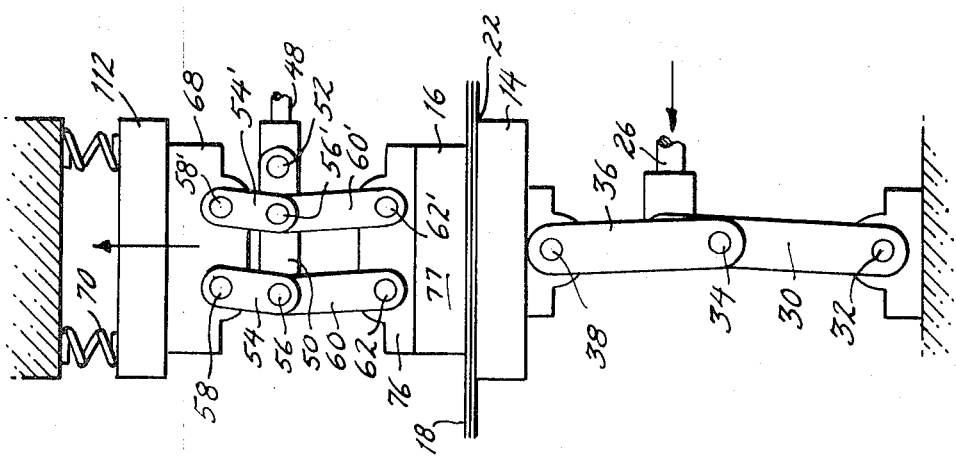
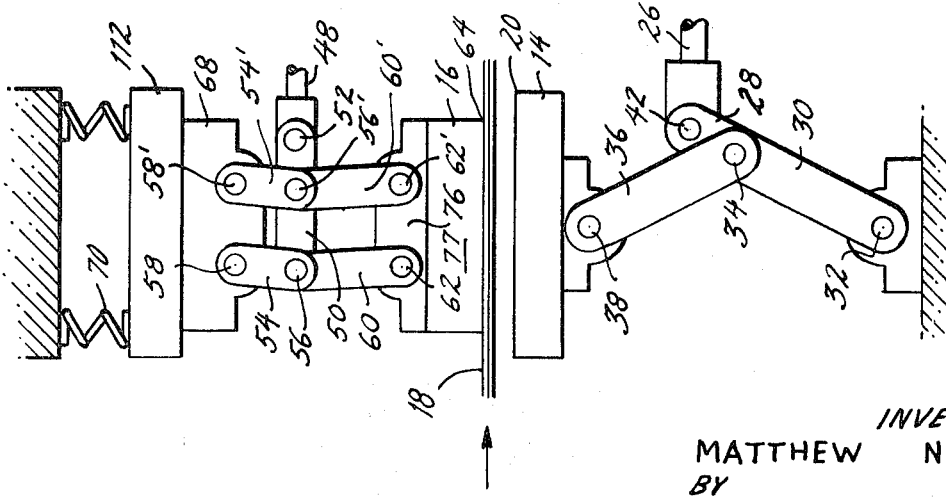

3,657,055

HEAT SEALING STATION

BACKGROUND OF THE INVENTION

The present invention relates to the general field of medicinal tablet packaging, and more particularly, is directed to a heat sealing station capable of sealing medicinal tablets or the like within continuous strips of laminated material.

In the interest of sanitation, speed, accuracy and inventory control, it has been increasingly the practice in institutions such as hospitals and nursing homes to utilize medicinal tablets sealed in blisters formed in a continuous strip of thermoplastic material. It is the usual procedure to pre-form a plurality of spaced blisters in a strip of thermoplastic material to receive the medicinal tablets individually therein. After filling, a strip of foil sheet is usually laminated to the top of the thermoplastic strip to seal the medicinal tablets within the thermoplastic blisters. The foil layer acts as a readily frangible closure to permit easy access to the medicinal tablets when desired for use. A heat responsive adhesive is generally employed to affix the foil layer to the thermoplastic layer. Prior workers in the field have experienced difficulty in designing and fabricating heat sealing equipment capable functioning at rates sufficient to handle the effluent from high speed medicinal tablet feeding apparatus presently available as exemplified by my co-pending application entitled "Apparatus for Packaging Medicinal Tablets or the Like," Ser. No. 26,616 filed Apr. 8, 1970.

SUMMARY OF THE INVENTION

The present invention relates generally to an apparatus designed to seal continuous webs of materials and more particularly, is directed to a heat sealing station designed to affix an elongate strip of foil material to the top surface of an elongate strip of thermoplastic material by activating an intermediate heat responsive adhesive layer.

The instant heat sealing station includes a lower pressure platen which is vertically reciprocal at right angles to and below the plane of travel of the elongate web of material. The pressure platen serves to press the foil layer and the thermoplastic layer upwardly against the upper heat seal unit to activate the heat sensitive adhesive to thereby affix the foil and thermoplastic strips. The pressure platen is provided with easily interchangeable platen plates which are designed with suitable hole patterns to accommodate various thermoplastic blister package configurations.

The upper heat seal unit includes a heat seal block with integral heater elements and resilient mounting construction. The heat seal block applies directly against the top surface of the upper foil strip and employs sufficient heat to fuse the adhesive layer by radiation through the foil material. The resilient mounting serves to absorb the shocks of repeated pressure contacts of the lower pressure platen resulting from the said reciprocating action.

The heat seal unit further includes stationary refrigeration means to precisely define the area of heat sealing in cooperation with the combined action of the lower pressure platen and the heat seal block. The upper seal unit includes air cylinder means which function to vertically elevate the heater from the top surface of the foil following the sealing operation to thus quickly pull the heater from the web material following the precise application of sufficient heat for adhesive sealing purposes.

It is therefore an object of the present invention to provide an improved apparatus for heat sealing elongate strips of the type set forth.

It is another object of the present invention to provide a novel heat sealing station including a vertically reciprocal lower pressure platen and a vertically reciprocal upper heat seal unit, the said heat unit and pressure platen functioning in vertical registry above and below elongate strips of superimposed materials.

It is another object of the present invention to provide a novel heat sealing station incorporating a lower pressure platen which is vertically reciprocal against an upper heat seal unit, the heat seal unit being resiliently mounted to receive cyclical pressure from the lower pressure platent.

It is another object of the present invention to provide a novel heat sealing station including a lower pressure platen for use with a strip of thermoplastic material having pre-formed blisters depending therefrom, the pressure platen including a patterned surface to cooperate with and to receive the depending blisters during the heat sealing operation.

It is another object of the present invention to provide a novel heat sealing station including opposed lower pressure platen means and upper heat seal means in vertical juxtaposition, each of the said pressure platen means and heat seal means being provided with respective vertically reciprocating means.

It is a further object of the present invention to provide a novel heat sealing station incorporating upper heat seal means including a heater block which is vertically reciprocal with respect to adjacent, fixed, refrigeration units.

It is another object of the present invention to provide a novel heat sealing station incorporating an upper, resiliently mounted heat seal unit, the resilient construction including easily changeable springs to control sealing pressure.

It is another object of the present invention to provide a novel heat sealing station that is rugged in construction, simple in design and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 6 is a schematic, end elevational view of the apparatus showing the condition while the web material to be sealed is in motion.

FIG. 7 is a schematic, end elevational view of the apparatus showing the position of parts when the web material is being sealed.

FIG. 8 is a schematic, end elevational view of the apparatus showing the relative position of parts when the machine is stopped.

DESCRIPTION OF THE PREFERRED EMBODIMENT OF THE INVENTION

Figure 1:
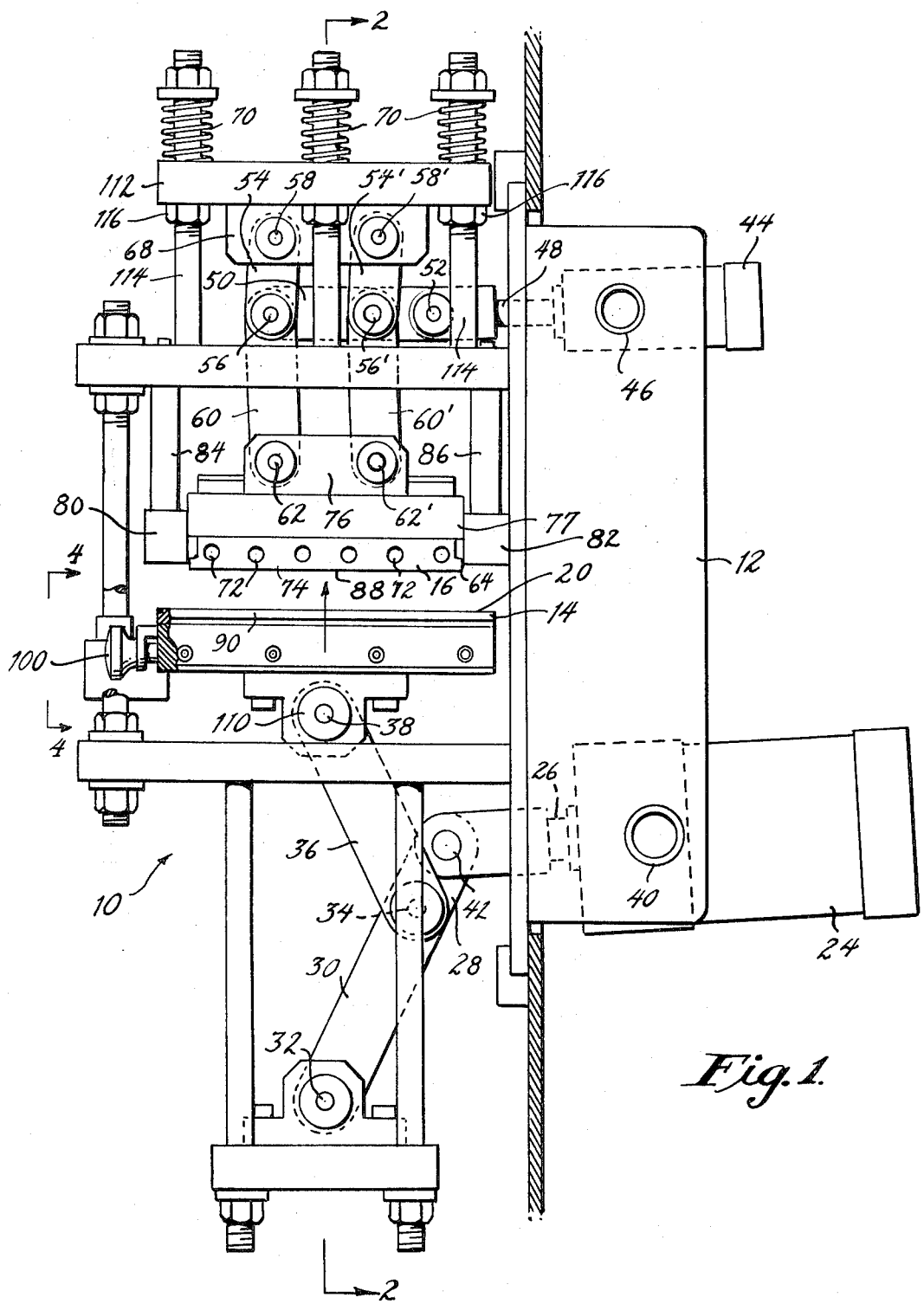
FIG. 1 is an end elevation view of the device looking upstream.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 an apparatus generally designated 10 for heat sealing elongate strips of material. A fixed frame 12 carries a lower pressure platen 14 and an upper heat seal unit 16 which arrange in vertical juxtaposition for heat sealing purposes. Both the pressure platen 14 and heat seal unit 16 are provided with means for vertical reciprocation with respect to the stationary frame 12 to heat seal the elongate strip 18 which comprises a lower, thermoplastic web 96, an upper foil web 102 and an intermediate layer of heat sensitive adhesive 108. The lower pressure platen 14 reciprocates from a lower position 20 as illustrated in FIGS. 1, 2, 6 and 8 to an upper, pressure sealing position 22 as illustrated in FIG. 7. A cylinder 24, which may be of the usual hydraulic or pneumatic type, journals to the frame 12 through the bushing 40 to reciprocate the lower pressure platen 14 by means of the piston rod 26, the piston rod pin 42 and the crank 28. The lower platen link 30 extends from the crank 28 pivotally connects to a stationary portion of the frame 12 through a pivot pin 32. The lower platen links 30 is responsive to action of the piston rod 26 through the crank pivot pin 34 and the piston rod pivot pin 42. The upper platen link 36 pivotally connects to the lower platen link 30 and the crank 28 at the crank pivot pin 34 and transmits vertical reciprocating forces to the lower pressure platen 14 through the bushing 110 which secures upon the upper pivot pin 38 in the usual manner. Thus, activation of the cylinder 24 causes resulting reciprocating motion in the lower pressure platen 14. It will be observed that the platen 14 vertically moves through a distance of approximately one inch to press the strip material 18 against the lower surface 88 of the heat seal unit 16. The operation of the cylinder 24 functions to successively push and pull the piston rod 26 to thereby reciprocate the platen 14 with respect to the frame 12. The bushing 40 affixes in the frame 12 and permits the cylinder 24 to pivot about the frame as required to compensate for the slight elevating effect of the combined crank 28 and lower platen line 30 as they pivot about the lower pivot pin 32.

The use of the lever action through the crank 28 and the upper and lower platen links 36, 30 combine to gain tremendous pressure for sealing purposes utilizing only a relatively small hydaulic cylinder 24. The positioning of the parts as illustrated generate great pressures when the linkage reaches its uppermost position due to the mechanical advantage while requiring the expenditure of only minimum amounts of hydraulic fluid.

The heat seal unit 16 positions vertically above the lower pressure platen 14 and is vertically reciprocal with respect to the frame 12. An upper cylinder 44 of the hydraulic or pneumatic type journals within the frame 12 by means of the upper cylinder bushing 46 and reciprocates its piston rod 48 in the usual manner. The piston rod 48 pivotally connects to the crank 50 through the piston pivot pin 52 to thereby impart generally horizontally reciprocating motion to the crank 50 upon function of the upper cylinder 44. The crank pivotally connects to the upper heat seal links 54, 54' at the respective pivot pins 56, 56' to thereby rotate the links 54, 54' about the upper pivot pins 58, 58' which affix to the upper crosshead 68. The lower heat seal unit links 60, 60' pivotally affix to the crank 50 and respective to the upper heat seal unit links 54, 54' through the pivot pins 56, 56'. The links 60, 60' terminate downwardly in pivotal connections to the lower crossheads 76 at the respective lower pivot pins 62, 62'. Operation of the cylinder 44 pushes the crank 50 to pivot the respective links 54, 60 and 54', 60' about the pivot pins 58, 58' to raise the heat seal unit 16. Downward movement of the upper crosshead 68 and its connected frame block 112 is prevented by the frame affixed threaded studs 114 and the nuts 116. Thus, activation of the cylinder 44 serves to vertically reciprocate the heat seal unit 16 through the piston rod 48, the crank 50, the action of the upper links 54, 54' and the lower links 60, 60'.

The heat seal unit 16 is reciprocal from a lower, heat sealing position 64 illustrated in FIGS. 1, 2, 6 and 7 to an upper position 66 as illustrated in FIG. 8. It will be observed in FIGS. 1, 6 and 7 that the respective upper and lower heat seal unit links 54, 54' and 60, 60' connect to the crank 50 in a manner to position off center when the heat seal unit 16 reciprocates to its lowermost position 64. By positioning the respective links off center, the links provide a resiliency in the upper heat seal unit 16 when impacted by the lower pressure platen 14 as the platen reciprocates to its upper, pressure sealing position 22. See FIG. 7. The upper links 54, 54' pivotally affix to the frame connected crosshead 68 which in turn resiliently affixes to the frame 12 through the block 112 and the compression springs 70. The combination of the compression springs 70, and the knee action of the respective off center linkage connections 54, 60 and 54', 60' combine to completely absorb all of the shock attendant with repeated impacts against the heat seal block 74 generated by the reciprocating operation of the lower pressure platen 14.

The springs 70 mount above the block 112 and are readily accessible by simply turning the top securing nuts to expose the springs. By employing heavier or weaker springs above the block 112, the sealing pressure between the lower pressure platen 14 and the heat seal unit 16 may be easily adjusted. Additionally, the resilient spring construction serves to protect the upper heat seal unit 16 from damage in the event a foreign object interposed between the pressure platen and heat seal unit during the sealing operation.

Figure 2:
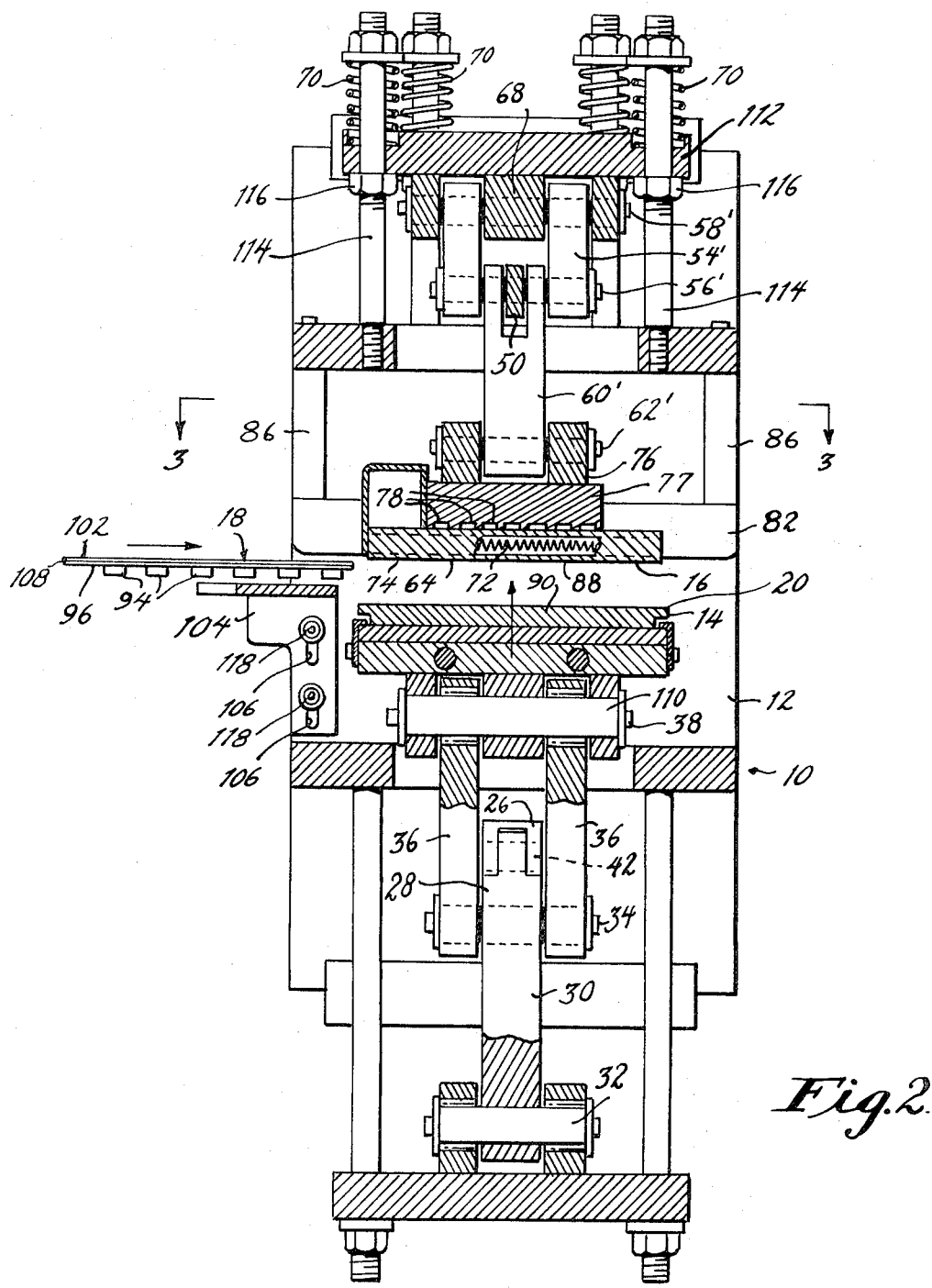
FIG. 2 is a cross sectional view taken along Line 2—2 of FIG. 1, looking in the direction of the arrows.
Figure 3:
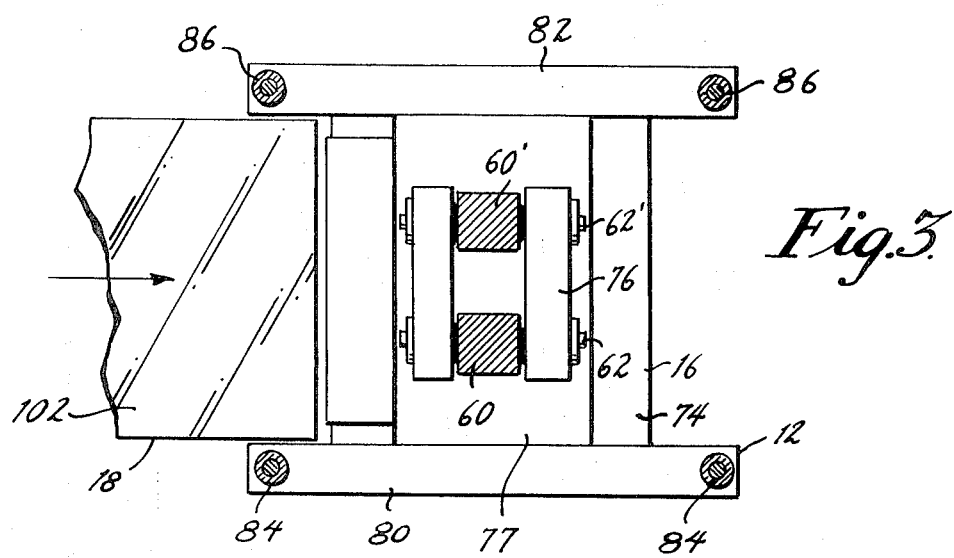
FIG. 3 is a cross sectional view taken along Line 3—3 of FIG. 2, looking in the direction of the arrows.

The heat seal unit 16 is provided with a plurality of spaced, longitudinally extending heating elements 72 which may be of the electric resistance type to evenly heat the entire heat seal unit block 74. As best seen in FIGS. 1 and 2, the heat seal block 74 connects the lower links 60, 60' through the lower crosshead 76 and the crosshead block 77. A plurality of transverse grooves 78 penetrate the bottom of the crosshead block 77 at the connection to the heat seal block 74 to thereby minimize radiation from the block by reducing contact area between the blocks 74, 77. In this manner, the heat available for sealing purposes at the lower block surface 88 is maximized. Front and rear refrigerating units 80, 82 longitudinally extend adjacent to the sides of the upper heat seal unit 16 and stationarily connect to the machine frame 12 through the respective supports 84, 86 as best seen in FIGS. 1 and 3, the refrigerating units 80, 82 serve to precisely limit the area of heat spread from the heat seal unit 16 to define the exact sealing area upon the elongate strip 18. It should be noted that the heat seal unit 16 vertically reciprocates with respect to the refrigerating units 80, 82 and when urged to its lower position 64, the lower surface 88 of the heat seal block 74 projects slightly beneath the bottom of the refrigerating units to contact the top of the strip 18 for heat sealing purposes.

Figure 5:
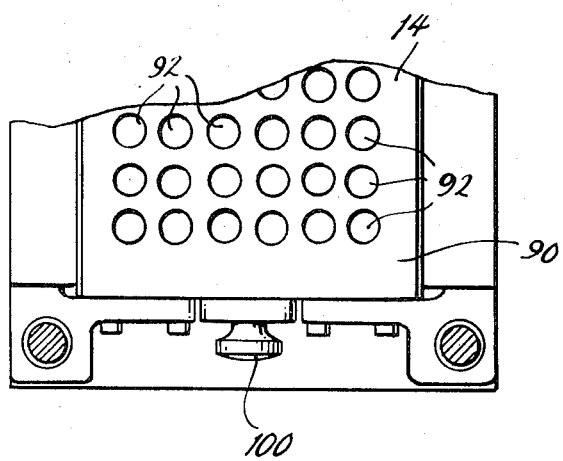
FIG. 5 is a partial, top plane view taken along Line 5—5 of FIG. 4, looking in the direction of the arrows.
Figure 4:
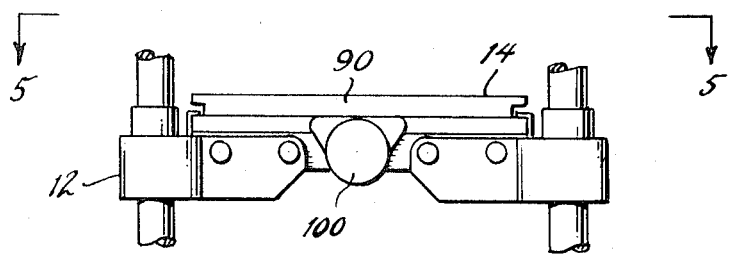
FIG. 4 is a partial, side elevational view taken along Line 4—4 of FIG. 1, looking in the direction of the arrows.

Referring now to FIGS. 4 and 5, I show the lower pressure platen 14 including a platen plate 90 which is provided with a plurality of precisely spaced recesses 92. The recesses 92 correspond in size and location to the depending blisters 94 which had previously been formed in the thermoplastic portion 96 of the strip material 18. In operation, the blisters 94 align directly over the platen plate recesses 92 and fit within the recesses when the lower pressure platen reciprocates to its upper, pressure sealing position 22. See FIG. 7. A threaded knob 100 removably, threadedly engages the pressure platen construction to lock the pressure plate 90 therein. It will be appreciated that various size blisters 94 may be formed in the thermoplastic strip 96 to accommodate medicinal tablets or capsules of different sizes. Accordingly, various size blisters 94 may be readily accommodated by the same equipment simply by providing additional platen plates 90 having recesses 92 corresponding in size, shape and location to the blisters in the strip being sealed. Through action of interchangeable platen plates 90 and readily engaging and disengaging construction such as the threaded knob 100, the apparatus may be readily and speedily altered to accommodate various sized pre-formed blister strips.

In operation, a strip 18 of elongate web material, for example, an upper foil layer 102 and a lower, blistered thermoplastic strip 96 having the blisters pre-filled with medicinal tablets are superimposed with a layer of heat sensitive adhesive 108 of any suitable, well known variety interposed between the layers. The strip 18 feeds into the apparatus 10 across the top of the receiving table 104. The table 14 is vertically adjustable by means of the elongate slots 106 and bolts 118 which turn into the machine frame 12 to position the strip 18 adjacent the lower surface 88 of the heat seal block 74. An indexing mechanism (not shown), of well known design, feeds the strip 18 into the apparatus 10 in measured segments in response to operation of the sealing mechanism.

As best seen in FIG. 6, when initiating the sealing operation, the lower pressure platen 14 reciprocates to its lower position 20, the upper heat seal unit 16 reciprocates to its lower, heat sealing position 64 and the strip 18 indexes into the apparatus 10. Upon completion of the strip indexing step, the cylinder 24 activates to reciprocate the pressure platen 14 upwardly to its upper pressure sealing position 22 through operation of the piston rod 26, crank 28, lower platen link 30 and the upper platen link 36. As previously indicated, the impact forces generated by operation of the lower pressure platen 14 are absorbed both by the compression springs 70 and the off set position of the heat seal unit upper and lower links 54, 54', 60, 60'. With the lower pressure platen 14 in its upper position 22 and the heat seal unit 16 in its lower position 64, the heating elements 72 function to rapidly seal the foil layer 102 to the thermoplastic layer 96 by activating the heat sensitive adhesive 108. Immediately upon completion of the heating cycle, the upper cylinder 44 functions to rapidly pull the heat seal unit 16 away from the sealed strip 18 through operation of the piston rod 48, the crank 50 and the upper and lower links 54, 54' and 60, 60' to prevent damage to the sealed material. The lower cylinder 24 again functions to reciprocate the lower pressure platen 14 to its lowermost position 20 thereby separating the depending blisters 94 from the platen recesses 92 to permit further indexing of the strip 18 through the apparatus 10. See FIG. 8. Upon lowering the upper heat seal unit 16 to its lowermost position 64 through operation of the upper cylinder 44 in the manner hereinbefore described, the apparatus resets to its initial position ready for indexing an additional length of material as in FIG. 6.

I claim:

1. In a heat seal station for sealing an elongate strip of superimposed materials having an intermediate heat sensitive adhesive layer, the combination of
    A. a frame;
    B. a lower pressure platen vertically reciprocal within the frame,
        1. said pressure platen being movable from a lower position to an upper position,
        2. said pressure platen being provided with reciprocating means;
    C. an upper heat seal unit vertically aligned above the said lower pressure platen,
        1. said heat seal unit being reciprocal from a lower position to an upper position,
            a. said upper position being out of contact with the said material strip,
        2. said upper heat seal unit being provided with reciprocating means and,
        3. said lower pressure platen pressing a portion of the said strip against the heat seal unit for sealing purposes when the pressure platen moves to its upper position and the heat seal unit reciprocates to its lower position; and
    D. resilient means absorbing the impact forces from reciprocation of the lower pressure platen into contact with the heat seal unit.

2. The invention of claim 1 wherein a portion of the resilient means include a portion of the said upper heat seal unit reciprocating means.

3. The invention of claim 1 wherein the said strip contains depending blisters and the said lower pressure platen is provided with recess means to receive the said depending blisters therein.

4. The invention of claim 3 wherein the recess means include a plurality of recesses of size and location to receive the said blisters.

5. The invention of claim 1 wherein the said lower pressure platen reciprocating means include a cylinder, the said cylinder being affixed to the said machine frame.

6. The invention of claim 5 wherein the said cylinder is provided with pivoting construction to permit pivotal movement of the said cylinder with respect to the said frame upon reciprocation of the lower pressure platen.

7. The invention of claim 2 wherein the said upper heat seal unit reciprocating means include an upper link and a lower link pivotally connected together, the said upper and lower links positioning off center in a resilient junction to provide a portion of the said resilient means.

8. The invention of claim 1 and stationary refrigeration means, the said refrigeration means precisely defining the area of upper heat seal unit operation.

9. The invention of claim 1 wherein the upper heat seal unit includes a heat seal block containing heating elements, the heat seal block connecting to the reciprocating means through an intermediate crosshead, the connection between the heat seal block and the crosshead being provided with groove means to limit heat radiation therethrough.

10. The invention of claim 7 wherein the upper links terminate upwardly in a pivotal connections to an upper crosshead, the said upper crosshead resiliently affixing to the said frame to provide the remainder of said resilient means.

11. The invention of claim 1 wherein the heat seal unit reciprocates to its said lower position and the pressure platen reciprocates to its lower position when the strip indexes into the heat seal station.

12. The invention of claim 1 wherein the said upper heat seal unit reciprocates to its upper position upon completion of the sealing operation.

13. The invention of claim 10 wherein the remainder of said resilient means include a plurality of compression springs interposed between the said crosshead and a portion of the frame.

14. The invention of claim 13 wherein the remainder of said resilient means incorporate means to readily change the said springs.

* * * * *